(12) United States Patent
Kuraki et al.

(10) Patent No.: US 9,371,236 B2
(45) Date of Patent: Jun. 21, 2016

(54) HIGHLY EFFICIENT METHOD FOR PRODUCING CERAMIC MICROPARTICLES

(75) Inventors: Jun Kuraki, Izumi (JP); Masaki Maekawa, Izumi (JP); Daisuke Honda, Izumi (JP); Masakazu Enomura, Izumi (JP)

(73) Assignee: M. TECHNIQUE CO., LTD., Izumi-Shi (JP)

( * ) Notice: Subject to any disclaimer, the term of this patent is extended or adjusted under 35 U.S.C. 154(b) by 313 days.

(21) Appl. No.: 14/004,117

(22) PCT Filed: Mar. 23, 2011

(86) PCT No.: PCT/JP2011/057058
§ 371 (c)(1),
(2), (4) Date: Sep. 9, 2013

(87) PCT Pub. No.: WO2012/127669
PCT Pub. Date: Sep. 27, 2012

(65) Prior Publication Data
US 2013/0343979 A1  Dec. 26, 2013

(51) Int. Cl.
| | |
|---|---|
| *B01J 14/00* | (2006.01) |
| *C01B 33/113* | (2006.01) |
| *C01B 13/14* | (2006.01) |
| *C01B 21/00* | (2006.01) |
| *C01B 19/00* | (2006.01) |
| *C01B 31/00* | (2006.01) |
| *C01B 33/00* | (2006.01) |
| *C01B 35/00* | (2006.01) |
| *C01B 9/00* | (2006.01) |
| *B01F 7/00* | (2006.01) |
| *C01B 33/193* | (2006.01) |
| *C01G 9/02* | (2006.01) |
| *C01G 23/00* | (2006.01) |
| *C01B 13/36* | (2006.01) |
| *B01J 19/18* | (2006.01) |
| *C01B 13/16* | (2006.01) |
| *C04B 35/626* | (2006.01) |

(52) U.S. Cl.
CPC ........... *C01B 33/113* (2013.01); *B01F 7/00775* (2013.01); *B01F 7/00791* (2013.01); *B01J 14/00* (2013.01); *B01J 19/1887* (2013.01); *C01B 9/00* (2013.01); *C01B 13/14* (2013.01); *C01B 13/16* (2013.01); *C01B 13/36* (2013.01); *C01B 19/00* (2013.01); *C01B 21/00* (2013.01); *C01B 31/00* (2013.01); *C01B 33/00* (2013.01); *C01B 33/193* (2013.01); *C01B 35/00* (2013.01); *C01G 9/02* (2013.01); *C01G 23/003* (2013.01); *C04B 35/62625* (2013.01); *C01P 2002/72* (2013.01); *C01P 2004/04* (2013.01); *C04B 2235/3284* (2013.01); *C04B 2235/3418* (2013.01); *C04B 2235/5445* (2013.01); *C04B 2235/5454* (2013.01); *C04B 2235/76* (2013.01)

(58) Field of Classification Search
None
See application file for complete search history.

(56) References Cited

U.S. PATENT DOCUMENTS

| | | | |
|---|---|---|---|
| 2010/0155310 A1 | 6/2010 | Enomura | |
| 2010/0215958 A1 | 8/2010 | Enomura | |
| 2010/0326321 A1* | 12/2010 | Enomura | ..................... 106/31.6 |
| 2011/0015054 A1 | 1/2011 | Enomura | |
| 2013/0156682 A1 | 6/2013 | Kuraki et al. | |

FOREIGN PATENT DOCUMENTS

| | | |
|---|---|---|
| CN | 101784484 A | 7/2010 |
| EP | 2 204 351 A | 7/2010 |
| EP | 2 610 215 A | 7/2013 |
| JP | 9-86906 A | 3/1997 |
| JP | 2005-162562 A | 6/2005 |
| JP | 2006-1806 A | 1/2006 |
| JP | 2009-82902 A | 4/2009 |
| JP | 2009-132596 A | 6/2009 |
| JP | 4359858 B2 | 11/2009 |
| WO | WO 2009/008392 A1 | 1/2009 |

OTHER PUBLICATIONS

Partial Translation of JP 2009-132596, Jun. 2009.*

* cited by examiner

*Primary Examiner* — Steven Bos
(74) *Attorney, Agent, or Firm* — Birch, Stewart, Kolasch & Birch, LLP

(57) ABSTRACT

Provided is a more suitable method for producing ceramic microparticles. The present invention uses at least two types of fluids to be processed; at least one of the fluids to be processed is a fluid containing a ceramic starting material liquid that mixes and/or dissolves a ceramic starting material in a basic solvent; of the fluids aside from the ceramic starting material liquid, at least one of the fluids to be processed is a fluid containing a solvent for precipitating ceramic microparticles; and ceramic microparticles are precipitated by mixing the fluid containing the ceramic starting material liquid and the fluid containing the solvent for precipitating ceramic microparticles within a thin film fluid formed between at least two surfaces (1,2) for processing that are provided facing each other, are able to approach and separate each other, and of which one is able to rotate with respect to the other. Ceramic microparticles having as increased crystallinity are obtained by mixing the fluid containing the precipitated ceramic microparticles precipitate and a fluid containing an acidic substance.

7 Claims, 5 Drawing Sheets

(A)

(B)

(A)

(B)

HIGHLY EFFICIENT METHOD FOR PRODUCING CERAMIC MICROPARTICLES

The present invention relates to a highly efficient method for producing ceramic microparticles.

BACKGROUND ART

The word ceramics is a general name of compounds except for organic compounds, thereby referring to all inorganic compounds. Accordingly, there are many compounds of it, wherein the most distinctive feature thereof resides in that it has not only excellent heat resistance and corrosive resistance inherently but also various functions in such fields as an electric, a dynamic, a magnetic, an optical, a mechanical, a thermal, a biochemical, and an energy field. Therefore, ceramics is used widely as an insulating substrate material, an electric conductive material, an ionic conductive material, a superconductive material, a dielectric functional material, a semiconductor material, a piezoelectric functional material, a CMP slurry, and so forth.

A ceramic construction member is produced by molding-calcination of the powders thereof, wherein there are merits in using ceramic microparticles for it because, for example, sintering can be done at lower temperature than ever while giving a dense structure, as shown in the Patent Document 1. In order to satisfy stability and required characteristics in ceramic products, a highly crystalline ceramic microparticle is further wanted.

To obtain a crystalline ceramic microparticle, a method in which a high thermal energy is given to an amorphous ceramic microparticle by a calcination, a hydrothermal process, and so forth thereby changing it to a crystalline ceramic microparticle is generally used. Here, to lower the calcination temperature thereof is important in view of not only the energy saving but also various costs associated with control of the calcination furnace and so on. Alternatively, as shown in the Patent Document 2, a method in which an impact is given to an amorphous ceramic microparticle by a ball mill and so forth thereby changing it to a crystalline ceramic microparticle is known. However, in the ceramic microparticle produced by using equipment such as a ball mill and a bead mill, there have been problems of not expressing expected characteristics such as semiconductor properties, transparency, spectroscopic properties, and durability because a strong force is applied to the particles (crystals).

Further, a method for producing a ceramic microparticle in which the microparticles thereof are separated in a thin film fluid that is running thorough between processing surfaces which are disposed in a position they are faced with each other, as shown by the Patent Document 3 filed by the applicant of the present invention, has been provided.

PRIOR ART DOCUMENTS

Patent Document

Patent Document 1: Japanese Patent Laid-Open Publication No. 2006-1806
Patent Document 2: Japanese Patent Laid-Open Publication No. 2005-162562
Patent Document 3: International Patent Laid-Open publication No. 2009/008392

DISCLOSURE OF THE INVENTION

Means for Solving the Problems

The present invention was made to solve the problems mentioned above and has an object to provide a method for producing a more appropriate ceramic microparticle. Therefore, the object is hopefully to provide a method for producing a ceramic microparticle with which a ceramic microparticle having the crystallinity thereof been controlled can be produced efficiently.

Means for Solving the Problems

Inventors of the present invention carried out an extensive investigation; and as a result, they found a method for producing a more appropriate ceramic microparticle by mixing, as fluids to be processed, a fluid which contains a ceramic raw material solution that is obtained by mixing and/or dissolving a ceramic raw material in a basic solvent with a fluid which contains a solvent for separating a ceramic microparticle between processing surfaces which are disposed in a position they are faced with each other so as to be able to approach to and separate from each other, at least one of which rotates relative to the other, and then further mixing the fluid which contains the separated microparticle with a fluid which contains an acidic substance; and based on this finding, they accomplished this invention.

A first embodiment of the present invention provides a method for producing a ceramic microparticle, wherein
each of (I) a ceramic raw material solution that is obtained by mixing and/or dissolving at least one ceramic raw material in a basic solvent, (II) a solvent for separating a ceramic microparticle, and (III) at least one acidic substance is prepared, wherein the method comprises:
(IV) a step of separating a ceramic microparticle, wherein
at least two fluids are used as fluids to be processed,
of these, at least one fluid is a fluid which contains the ceramic raw material solution and
at least one fluid other than the ceramic raw material solution is a fluid which contains the solvent for separating the ceramic particle, wherein
the fluid which contains the ceramic raw material solution is mixed with the fluid which contains the solvent for separating the ceramic microparticle in a thin film fluid formed between at least two processing surfaces which are disposed in a position they are faced with each other so as to be able to approach to and separate from each other, at least one of which rotates relative to the other thereby separating the ceramic microparticle, and
(V) a step of mixing the fluid which contains the separated ceramic microparticle obtained in (IV) with the fluid which contains the acidic substance.

A second embodiment of the present invention provides the method for producing a ceramic microparticle according to the first embodiment of the present invention, wherein
any one of the fluid which contains the ceramic raw material solution and the fluid which contains the solvent for separating the ceramic microparticle passes through between the at least two processing surfaces with forming the thin film fluid,
a separate introduction path independent of a flow path through which the any one of the fluids passes is arranged,
at least any one of the at least two processing surfaces is provided with at least one opening to the introduction path,
any other one of the fluid which contains the ceramic raw material solution and the fluid which contains the solvent for separating the ceramic microparticle is introduced into between the at least two processing surfaces through the opening, whereby mixing the fluid which contains the ceramic raw material solution with the fluid which contains the solvent for separating the ceramic microparticle in the thin film fluid.

A third embodiment of the present invention provides the method for producing a ceramic microparticle according to the first or the second embodiment of the present invention, wherein the method comprises:

a step of separating a ceramic microparticle by mixing the fluid which contains the ceramic raw material solution with the fluid which contains the solvent for separating the ceramic microparticles in the thin film fluid formed between at least two processing surfaces which are disposed in a position they are faced with each other so as to be able to approach to and separate from each other, at least one of which rotates relative to the other, and a step of mixing the fluid which contains the separated ceramic microparticle obtained in the above-mentioned step with the fluid which contains the acidic substance, wherein these steps are carried out continuously.

A fourth embodiment of the present invention provides the method for producing a ceramic microparticle according to the third embodiment of the present invention, wherein at least any one of the at least two processing surfaces is provided with an opening to introduce the fluid which contains the acidic substance into between the at least processing surfaces, the fluid which contains the ceramic raw material solution is mixed with the fluid which contains the solvent for separating the ceramic microparticle in the thin film fluid to separate the ceramic microparticle, and thereafter, the acidic substance is contacted and acted with the fluid which contains the separated ceramic microparticle in the thin film fluid.

A fifth embodiment of the present invention provides the method for producing a ceramic microparticle according to the third embodiment of the present invention, wherein an opening to supply the fluid which contains the acidic substance is arranged in a position to face a discharge part of the at least two processing surfaces, the fluid which contains the ceramic raw material solution is mixed with the fluid which contains the solvent for separating the ceramic microparticle in the thin film fluid to separate the ceramic microparticle thereby discharging the fluid which contains the separated ceramic microparticle through the discharge part, and immediately thereafter, the acidic substance is contacted and acted with the fluid which contains the separated ceramic microparticle.

A sixth embodiment of the present invention provides the method for producing a ceramic microparticle according to any one of the first to the fifth embodiments of the present invention, wherein a heat of reaction that is generated by mixing the fluid which contains the separated ceramic microparticle with the fluid which contains the acidic substance is utilized to enhance a crystallinity of the ceramic microparticle.

Advantages

According to the present invention, provided is a novel method which can produce a ceramic microparticle properly and stably. According to the present invention, provided especially is a highly efficient method for producing a ceramic microparticle cheaply and stably because a ceramic microparticle having the crystallinity thereof been controlled can be produced more conveniently with lower energy and lower cost than ever.

BRIEF DESCRIPTION OF DRAWINGS

FIG. 1 is a schematic sectional view showing the fluid processing apparatus according to an embodiment of the present invention.
FIG. 2(B) is an enlarged view showing an important part of the processing surface in the apparatus.
FIG. 3(A) is a sectional view of the second introduction member of the apparatus,
and FIG. 3(B) is an enlarged view showing an important part of the processing surface for explaining the second introduction member.

Figure 1:
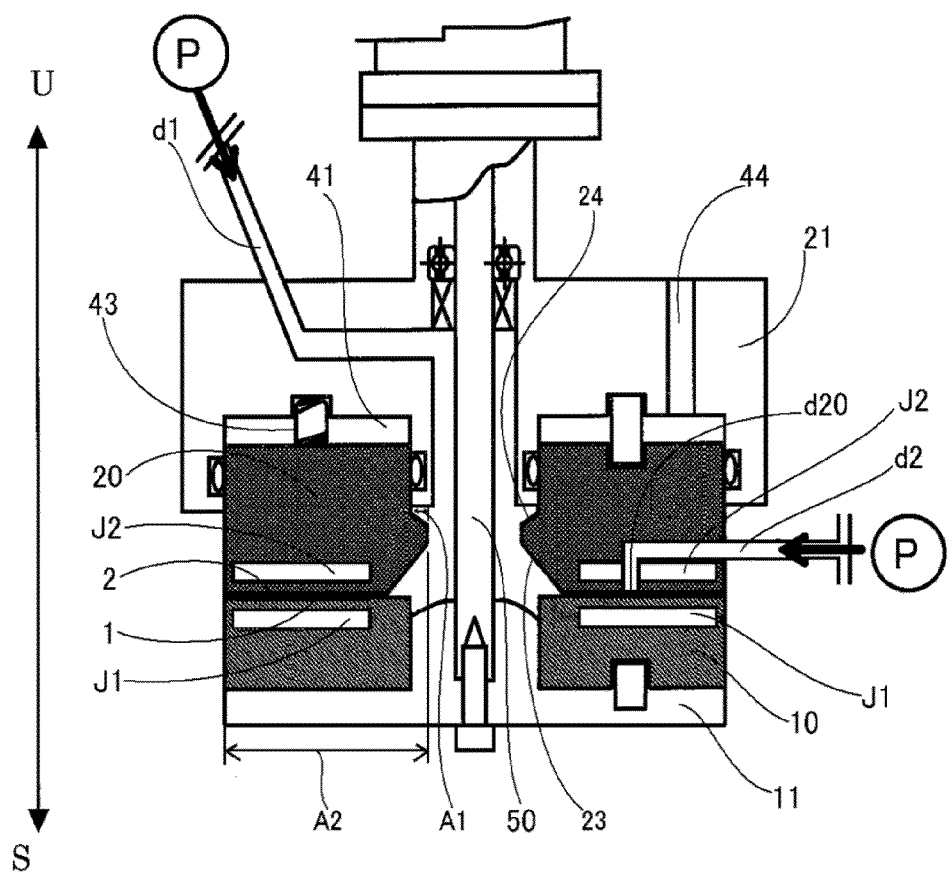
[FIG. 1]

Hereinafter, detailed explanation of the present invention will be made; but a technical range of the present invention is not limited by the following Embodiments and Examples.
Ceramic Microparticle:

The ceramic microparticle in the present invention is not particularly restricted, so that it includes microparticles of all compounds except for organic compounds, namely microparticles of all inorganic compounds. The elements capable of being the inorganic compounds are not particularly restricted; and thus, all elements in the periodic table may be mentioned. Illustrative example of the compound capable of being used as the ceramic microparticle includes compounds of a metal and/or a non-metal; specifically a metal or a non-metal in the form of an oxide, a nitride, a carbide, a sulfide as well as a metal or a non-metal in the form of a salt, a hydroxide, a hydroxylated oxide, a complex, and a hydrate and an organic solvent adduct of them. Illustrative example of the metal salt or the non-metal salt includes a metal or a non-metal in the form of a nitrate salt, a nitrite salt, a sulfate salt, a sulfite salt, a formate salt, an acetate salt, a phosphate salt, a phosphite salt, a hypophosphite salt, a chloride, an oxy salt, an acetylacetonato salt, and a hydrate or an organic solvent adduct of these metal salts or non-metal salts, though not particularly restricted by them. In the present invention, however, the ceramic microparticle is not restricted only to these inorganic compounds; and thus, practically the ceramic microparticle in which an organic compound or molecule is incorporated or the ceramic microparticle which is covered with an organic compound may also be mentioned.
Composite Ceramic Microparticle:

The metal or the non-metal that constitutes the ceramic microparticle is not particularly restricted; and illustrative example thereof includes metal elements such as Ti, Fe, W, Pt, Au, Cu, Ag, Pb, Ni, Mn, Co, Ru, V, Zn, Zr, Sn, Ta, Nb, Hf, Cr, Mo, Re, In, Ir, Os, Y, Tc, Pd, Rh, Sc, Ga, Al, Bi, Na, Mg, Ca, Ba, La, Ce, Nd, Ho, and Eu; and non-metal elements such as B, Si, Ge, As, Sb, C, N, O, S, Te, Se, F, Cl, Br, I, and At. These elements each may constitute the ceramic microparticle singly as these metal/non-metal compounds or non-metal/non-metal compounds, or the ceramic microparticle may be formed of a plurality of these elements. In other words, the ceramic microparticle having the metal/non-metal compounds or the non-metal/non-metal compounds doped with a different element (dope element) as well as the ceramic microparticle not having the dope element may be produced.

Ceramic Microparticle 2:

Although there is no particular restriction as to the oxide or the hydroxide, such as for example, metal oxide or non-metal oxide having the formula of $M_xO_y$, metal hydroxide or a non-metal hydroxide having the formula of $M_p(OH)_q$, metal hydroxide oxide or non-metal hydroxide oxide having the formula of $M_r(OH)_sO_t$, various solvated forms of them, composition containing these substances as main components, and so forth may be mentioned (in the formulae, each of x, y, p, q, r, s, and t is an arbitrary integer). The oxide, the hydroxide or the hydroxide oxide includes peroxide, superoxide, and so forth.

Ceramic Microparticle 3:

Although there is no particular restriction as to the metal oxide or the non-metal oxide having the formula of $M_xO_y$ in the present invention, such as for example, $TiO_2$, $SnO$, $SnO_2$, $Al_2O_3$, $SiO_2$, $ZnO$, $CoO$, $Co_3O_4$, $Cu_2O$, $CuO$, $Ni_2O_3$, $NiO$, $MgO$, $Y_2O_3$, $VO$, $VO_2$, $V_2O_3$, $V_2O_5$, $MnO$, $MnO_2$, $CdO$, $ZrO_2$, $PdO$, $PdO_2$, $MoO_3$, $MoO_2$, $Cr_2O_3$, $CrO_3$, $In_2O_3$, or $RuO_2$ may be mentioned.

Ceramic Microparticle 4:

Although there is no particular restriction as to the metal hydroxide or the non-metal hydroxide having the formula of $M_p(OH)_q$ in the present invention, such as for example, $Sn(OH)_2$, $Sn(OH)_4$, $Al(OH)_3$, $Si(OH)_4$, $Zn(OH)_2$, $Co(OH)_2$, $Co(OH)_3$, $CuOH$, $Cu(OH)_2$, $Ni(OH)_3$, $Ni(OH)_2$, $Mg(OH)_2$, $Y(OH)_3$, $V(OH)_2$, $V(OH)_4$, $V(OH)_3$, $Mn(OH)_2$, $Mn(OH)_4$, $Cd(OH)_2$, $Zr(OH)_4$, $Pd(OH)_2$, $Pd(OH)_4$, $Mo(OH)_4$, $Cr(OH)_3$, and $Ru(OH)_4$ may be mentioned. Although there is no particular restriction in the metal hydroxide oxide or the non-metal hydroxide oxide having the formula of $M_r(OH)_sO_t$, FeOOH, MnOOH, NiOOH, AlOOH, and so forth may be mentioned.

Ceramic Microparticle 5:

Illustrative example of the metal nitride or the non-metal nitride in the present invention includes boron nitride (BN), carbon nitride (C3N4), silicon nitride ($Si_3N_4$), gallium nitride (GaN), indium nitride (InN), aluminum nitride (AlN), chromium nitride ($Cr_2N$), copper nitride ($Cu_3N$), iron nitride ($Fe_4N$), iron nitride ($Fe_3N$), lanthanum nitride (LaN), lithium nitride ($Li_3N$), magnesium nitride ($Mg_3N_2$), molybdenum nitride ($Mo_2N$), niobium nitride (NbN), tantalum nitride (TaN), titanium nitride (TiN), tungsten nitride ($W_2N$), tungsten nitride ($WN_2$), yttrium nitride (YN), and zirconium nitride (ZrN), though not particularly restricted by them. Illustrative example of the metal carbide or the non-metal carbide in the present invention includes calcium carbide ($CaC_2$), silicon carbide (SiC), boron carbide ($B_4C$), tungsten carbide (WC), tungsten carbide ($W_2C$), titanium carbide (TiC), zirconium carbide (ZrC), and vanadium carbide ($VC_x$), though not particularly restricted by them.

Crystallinity of the Ceramic Microparticle:

Although the ceramic microparticle in the present invention is wherein it shows crystallinity, the present invention is not limited to the crystalline ceramic microparticle. An amorphous ceramic microparticle can be produced as well; and further, the crystalline ceramic microparticle which partially contains an amorphous part therein may also be produced.

Ceramic Raw Material 1:

The ceramic raw material solution in the present invention is not particularly restricted so far as it is the solution of at least one ceramic raw material mixed with and/or dissolved in a solvent that will be described later. Illustrative example of the ceramic raw material in the present invention includes a metal, a non-metal, and a compound of them. The metal or the non-metal that can be used as the ceramic raw material is not particularly restricted; and thus, single bodies or metal alloys of all elements in the periodic table may be mentioned for it. Illustrative example of the compound of the metal and the non-metal includes the metals and non-metals in the form of a salt, an oxide, a nitride, a carbide, a complex, an organic salt, an organic complex, and an organic compound, though not particularly restricted by them. The ceramic raw material mentioned above may be used, depending on the purpose, singly or as a mixture of plurality of them.

Ceramic Raw Material 2:

Illustrative example of the metal salt or the non-metal salt includes the metals or the non-metals in the form of a nitrate salt, a nitrite salt, a sulfate salt, a sulfite salt, a formate salt, an acetate salt, a phosphate salt, a phosphite salt, a hypophosphite salt, a chloride, an oxy salt, and an acetylacetonato salt, though not particularly restricted by them; and here, those compounds mentioned before as the examples capable of becoming the ceramic microparticle may be mentioned.

Solvent:

In the present invention, the above-mentioned ceramic raw material should be used by mixing it with a solvent, preferably by dissolving or molecular-dispersing it in a solvent. Illustrative example of the solvent that is used to mix with, dissolve, or molecular-disperse the ceramic raw material includes water, an organic solvent, and a mixed solvent of plurality of them. Illustrative example of the water includes tap water, ion-exchanged water, pure water, ultrapure water, and RO water. Illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogen-containing compound solvent, an ester compound solvent, an ionic liquid, a carboxylic acid compound, and a sulfonic acid compound. These solvents may be used separately or as a mixture of a plurality of them.

Basic Substance and Acidic Substance:

In addition, the present invention may be carried out by mixing or dissolving a basic substance or an acidic substance in the foregoing solvents in the range not adversely affecting separation of the ceramic microparticles. Illustrative example of the basic substance includes a metal hydroxide such as sodium hydroxide and potassium hydroxide; a metal alkoxide such as sodium methoxide and sodium isopropoxide; and an amine compound such as triethylamine, diethylamino ethanol, and diethylamine. Illustrative example of the acidic substance includes an inorganic acid such as aqua regia, hydrochloric acid, nitric acid, fuming nitric acid, sulfuric acid, and fuming sulfuric acid; and an organic acid such as formic acid, acetic acid, chloroacetic acid, dichloroacetic acid, oxalic acid, trifluoroacetic acid, trichloroacetic acid, and citric acid. These basic or acidic substances may be used as a mixture with the various solvents as mentioned above, or each of the substances may be used separately. These basic or acidic substances may be used after they are mixed with various solvents in advance, as mentioned above to carry out the present invention; or they may be used by mixing these basic or acidic substances with the foregoing solvents just before separation of the ceramic microparticles by using respective separate and independent flow paths as mentioned later.

Solvent 2:

To explain the foregoing solvents in more detail, an illustrative example of the alcohol compound solvent includes a linear alcohol such as methanol, ethanol, n-propanol and n-butanol; a branched alcohol such as isopropanol, 2-butanol, tert-butanol and 1-methoxy-2-propanol; and a polyvalent alcohol such as ethylene glycol and diethylene glycol. An illustrative example of the ketone compound solvent includes acetone, methyl ethyl ketone, and cyclohexanone. An illustrative example of the ether compound solvent includes dimethyl ether, diethyl ether, tetrahydrofuran and propylene glycol monomethyl ether. An illustrative example of the aromatic compound solvent includes nitrobenzene, chlorobenzene, and dichlorobenzene. An illustrative example of the aliphatic compound solvent includes hexane. An illustrative example of the nitrile compound solvent includes acetonitrile. An illustrative example of the sulfoxide compound solvent includes dimethyl sulfoxide, diethyl sulfoxide, hexamethylene sulfoxide, and sulfolane. An illustrative example of the halogen-containing compound solvent includes chloroform, dichloromethane, trichloroethylene, and iodoform. An illustrative example of the ester compound solvent includes ethyl acetate, butyl acetate, methyl lactate, ethyl lactate, and 2-(1-methoxy)propyl acetate. An illustrative example of the ionic liquid includes a salt of 1-butyl-3-methyl imidazolium with PF6-(hexafluorophosphate ion). An illustrative example of the amide compound solvent includes N,N-dimethylformamide, 1-methyl-2-pyrrolidone, 2-pyrrolidinone, 1,3-dimethyl-2-imidazolidinone, 2-pyrrolidinone, □-caprolactam, formamide, N-methyl formamide, acetamide, N-methylacetamide, N,N-dimethylacetamide, N-methylpropaneamide, and hexamethylphosphoric triamide. An illustrative example of the carboxylic compound includes 2,2-dichloropropionic acid and squaric acid. An illustrative example of the sulfonic acid compound includes methanesulfonic acid, p-toluenesulfonic acid, chlorosulfonic acid, and trifluoromethane sulfonic acid.

Ceramic Raw Material Solution:

In the present invention, it is preferable that the ceramic raw material be mixed with and/or dissolved in a basic solvent to form the ceramic raw material solution. As to the basic solution, the basic solution of the basic substance having mixed with and/or dissolved in the foregoing solvents may be used; or alternatively, the ceramic raw material solution that becomes basic after the ceramic raw material is mixed with and/or dissolved in the solvent may be used. In the present invention, pH of the ceramic raw material solution is 7 or higher, or preferably 9 or higher.

Solvent for Separating the Ceramic Microparticle:

As to the solvent for separating the ceramic microparticles by mixing it with the ceramic raw material, the same solvents as mentioned above may be used. The solvent for mixing therewith and/or dissolving thereinto and the solvent for separating the microparticles may be selected in accordance with the ceramic microparticle to be obtained.

To carry out the present invention, it is preferable that mixing of the fluid which contains the ceramic raw material solution with the fluid which contains the solvent for separating ceramic microparticle be done by stirring and uniformly mixing these fluids in a thin film fluid formed between processing surfaces which are disposed in a position they are faced with each other so as to be able to approach to and separate from each other, at least one of which rotates relative to the other. As to the apparatus like this, for example, an apparatus based on the same principle as the one that is disclosed in Patent Document 3 which was filed by the present applicant may be used. By using the apparatus based on the principle like this, the ceramic microparticles can be produced.

Hereinafter, embodiments of the above-mentioned apparatus will be explained by using the drawings.

Figure 2:
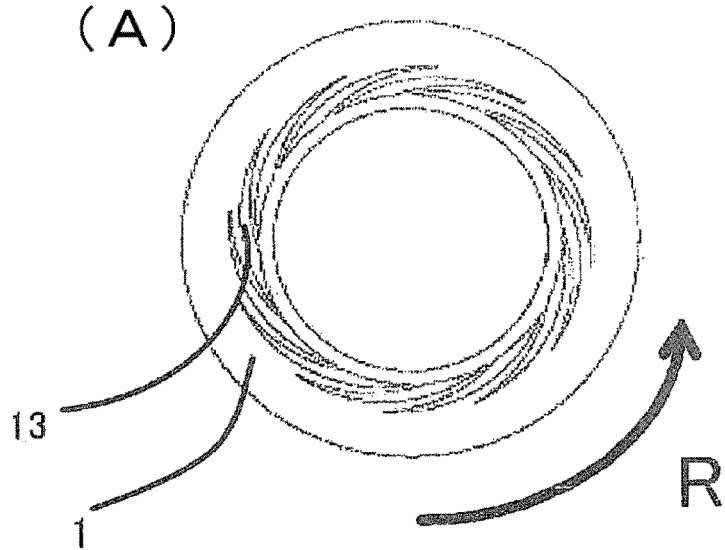
[FIG. 2]
FIG. 2 (A) is a schematic plane view of the first processing surface in the fluid processing apparatus shown in FIG. 1.
Figure 2:
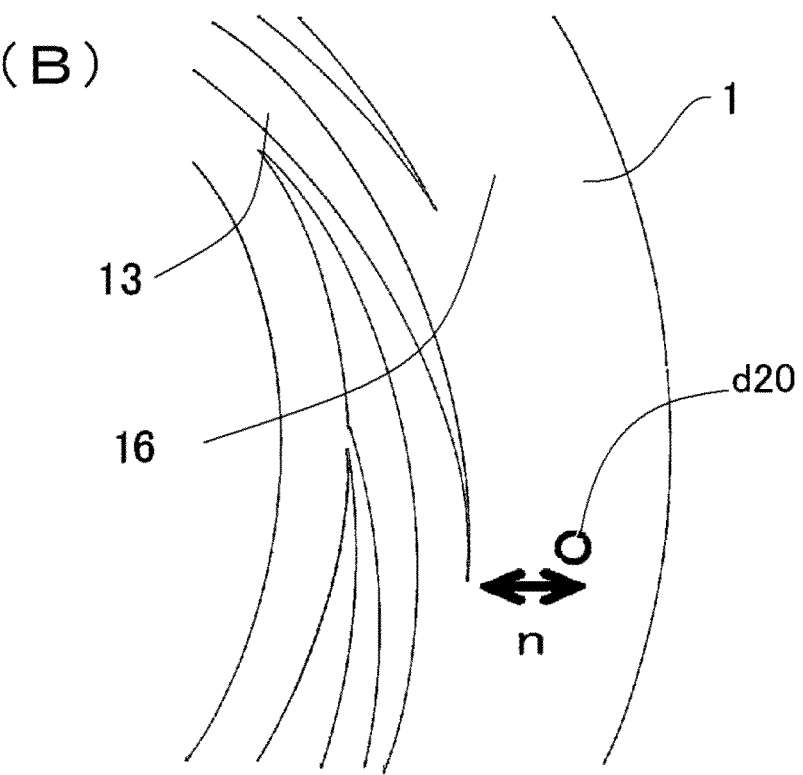
Figure 3:
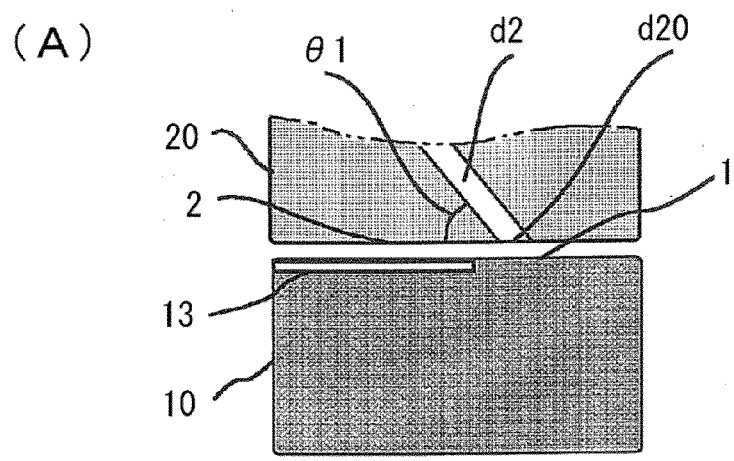
[FIG. 3]
Figure 3:
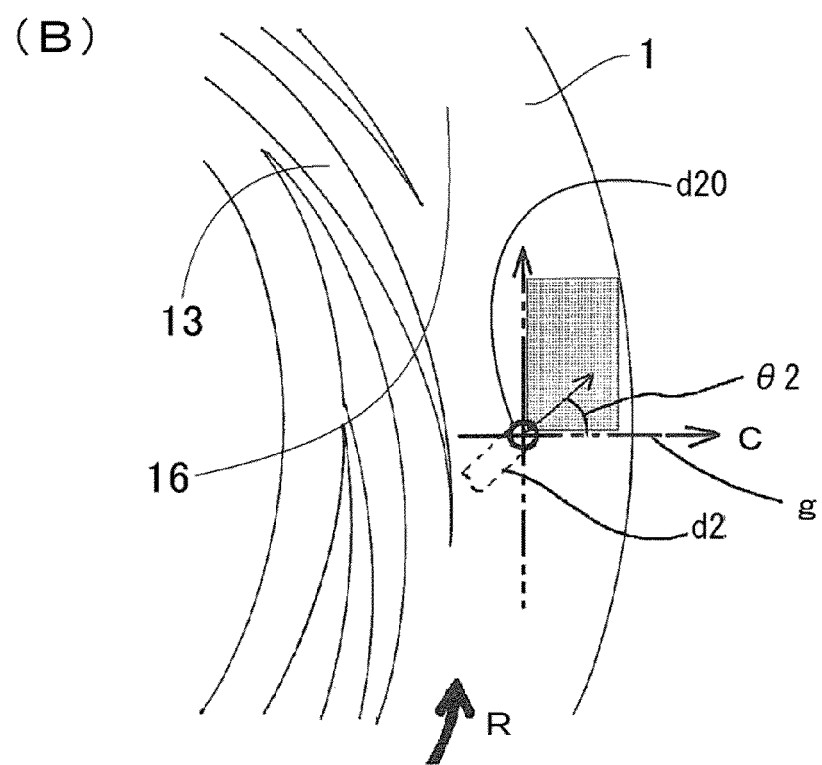

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 μm to 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a depression for mainly accepting that side of the second processing member 20 opposite to the second processing surface 2, and this depression is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the nanoparticles therefrom be effected under the condition of a laminar flow.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member 10 and 20 is not particularly restricted in its form, size, and number; and these may be changed as appropriate. The opening for introduction may be arranged just before the first and second processing surfaces 1 and 2 or in the side of further upstream thereof.

In the apparatus mentioned above, treatment such as separation, precipitation, and crystallization takes place with forced and uniform mixing between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately adjusting the rotation number of the processing members 10 and 20, the flow rate, the distance between the processing surfaces 1 and 2, the raw material concentration in the fluid to be processed, the kind of the solvent in the fluid to be processed, and the like.

Hereunder, specific embodiments as to the method for producing ceramic microparticles by using the above-mentioned apparatus will be explained.

In the apparatus, the fluid which contains a ceramic raw material solution that is obtained by mixing and/or dissolving at least one ceramic raw material in a basic solvent is mixed with the fluid which contains the solvent for separating the ceramic microparticles in the thin film fluid formed between the processing surfaces which are disposed in a position they are faced with each other so as to be able to approach to and separate from each other, at least one of which rotates relative to the other, thereby separating the ceramic microparticles.

The reaction accompanied with separation of the ceramic microparticles takes place in the apparatus shown in FIG. 1 under a forced and uniform mixing between the processing surfaces 1 and 2 arranged opposite to each other so as to be able to approach to and separate from each other, at least one of which rotates relative to the other.

Firstly, the fluid which contains the solvent for separating the ceramic microparticles is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, from a different flow path, i.e., from the second introducing part d2, a second fluid containing a microparticle raw material solution is introduced directly into the first fluid film (thin film fluid) formed between the processing surfaces 1 and 2.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby effecting the reaction to separate the ceramic microparticles.

Then, the ceramic microparticles that are separated from the processing surfaces 1 and 2 can be discharged as the dispersion solution of the ceramic microparticles.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

As mentioned above, the processing apparatus may be provided with, in addition to the first introduction part d1 and the second introduction part d2, the third introduction part d3; and in this case, for example, each of the first fluid, the second fluid, and the third fluid may be introduced separately into the processing apparatus through each introduction part. By so doing, concentration and pressure of each solution can be controlled separately so that the separation reaction of the ceramic microparticles may be controlled more precisely. A combination of the fluids to be processed (first to third fluids) that are introduced into each of the introduction parts may be set arbitrarily. The same is applied if the fourth or more introduction parts are arranged; and by so doing, fluids to be introduced into the processing apparatus maybe subdivided. In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

The pH of the Fluid which Contains the Separated Ceramic Microparticles:

In the present invention, pH of the fluid which contains the ceramic microparticles separated between the processing surfaces 1 and 2 is not particularly restricted; however, as mentioned later, in order to efficiently utilize heat of the reaction with the acidic substance for control of the ceramic crystallinity, the basic condition with pH of 7 or lower is preferable. However, this pH is different in accordance with the intended ceramic microparticles.

Contact and Action with the Acidic Solvent:

In the present invention, the ceramic microparticle having the crystallinity thereof been controlled may be produced by contacting and acting the acidic substance with the fluid which contains the ceramic microparticles separated between the processing surfaces 1 and 2. Specifically, crystallinity of the separated ceramic microparticles can be controlled by the heat of reaction such as the heat of neutralization generated by contacting and acting the acidic substance with the fluid which contains the ceramic microparticles separated in the thin film fluid formed between the processing surfaces 1 and 2; preferably, crystallinity of the ceramic microparticles can be enhanced by utilizing the heat of reaction (exothermic or endothermic).

Acidic Substance:

The acidic substance is not particularly restricted. Illustrative example the acidic substance includes inorganic acids such as aqua regia, hydrochloric acid, nitric acid, fuming nitric acid, sulfuric acid, fuming sulfuric acid, hydrofluoric acid, perchloric acid, and hexafluorosilicic acid, or the salts of them; and organic acids such as formic acid, acetic acid, chloroacetic acid, dichloroacetic acid, oxalic acid, trifluoroacetic acid, and trichloroacetic acid, or the salts of them. In addition to these acidic substances, hydrogen peroxide may be used. These substances may be used singly or as a mixture of plurality of them. The acidic substance is used preferably by mixing it with a solvent; or more preferably, it is used as an acidic solvent in which the acidic substance is dissolved or molecular dispersed. In the present invention, pH of the acidic solvent is 7 or less, or more preferably 5 or more.

Contact and Action with the Acidic Substance Between the Processing Surfaces:

According to one embodiment of the present invention, the fluid which contains the acidic substance is introduced as the third fluid into between the processing surfaces 1 and 2 after separating the ceramic microparticles in the thin film fluid formed between the processing surfaces 1 and 2 which are disposed in a position they are faced with each other so as to be able to approach to and separate from each other, at least one of which rotates relative to the other, and before discharging the dispersion solution of the ceramic microparticles from between the processing surfaces; by so doing, the fluid which contains the ceramic microparticles separated between the processing surfaces 1 and 2 can be mixed with the fluid which contains the acidic substance between the processing surfaces 1 and 2 so that the fluid which contains the ceramic microparticles separated between the processing surfaces 1 and 2 can be contacted and acted with the acidic substance between the processing surfaces 1 and 2. The heat of reaction generated by contacting and acting the acidic substance with the fluid which contains the ceramic microparticles separated between the processing surfaces 1 and 2 is very large; however, when compared with the case that the acidic substance is contacted and acted with the dispersion solution of the ceramic microparticles after it is discharged from the processing surfaces, this heat of reaction can be utilized in a closed space formed between the processing surfaces, and thus, crystallinity of the ceramic microparticles can be controlled more easily so that the ceramic microparticles having high crystallinity can be produced. In addition, not only there is a merit in that pH can be controlled highly precisely but also the risk associated with the reaction can be reduced or avoided because the reaction like this can be carried out in the very narrow flow path between the processing surfaces.

Specific Contact and Action with the Acidic Solvent Between the Processing Surfaces:

Specifically, the processing instrument is provided with, in addition to the first introduction part d1 and the second introduction part d2, the third introduction part d3; and in this case, for example, each of the fluid which contains the solvent for separating the ceramic microparticles as the first fluid, the fluid which contains the ceramic raw material solution as the second fluid, and the fluid which contains the acidic substance as the third fluid may be introduced separately into the processing apparatus through the first introduction part d1, the second introduction part d2, and the third introduction part d3, respectively. In this case, the third introduction part d3 to introduce the fluid which contains the acidic substance is arranged in the downstream side of the first introduction part d1 and the second introduction part d2, or in more detail, the opening d30 of the third introduction part d3 is arranged in the downstream side of the opening d20 of the second introduction part d2; by so arranging, the basic fluid which contains the ceramic microparticles separated between the processing surfaces 1 and 2 may be effectively contacted and acted with the acidic substance (see, FIG. 4(C)).

Figure 4:
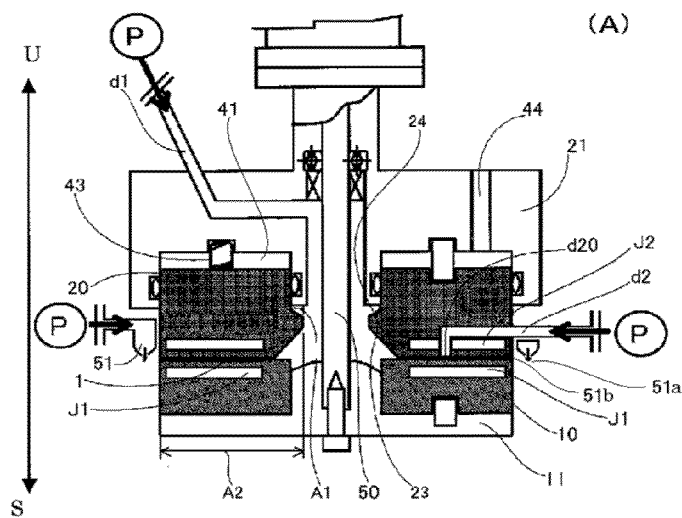
[FIG. 4]
These drawings show rough cross-section views of one exemplar equipment that is arranged in the fluid processing apparatus shown in FIG. 1, wherein with this equipment the acidic substance is contacted and acted with the fluid which contains the ceramic microparticles separated between the processing surfaces of the said apparatus, wherein (A) shows the apparatus that is provided with a supplying equipment of the fluid which contains the acidic substance, (B) shows the apparatus that is provided with the flow path through which the fluid containing the ceramic microparticles passes as a converged stream as well as with a charging hole for the fluid which contains the acidic substance, and (C) shows the apparatus that is provided with a third introduction part to introduce the fluid which contains the acidic substance into the apparatus.
Figure 4:
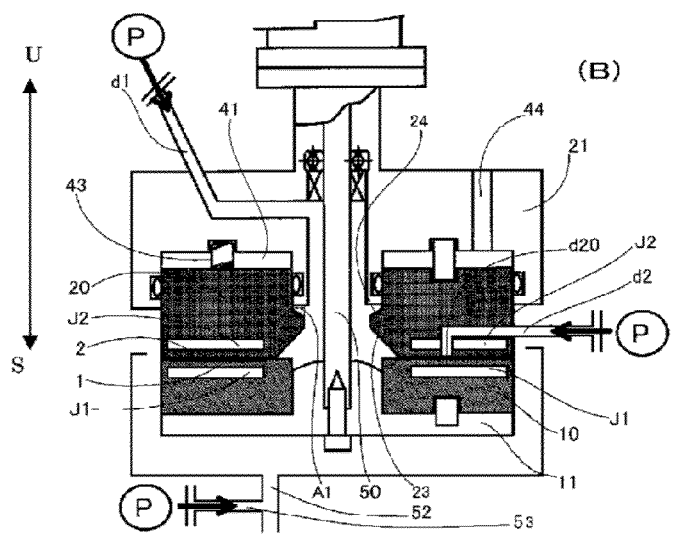
Figure 4:
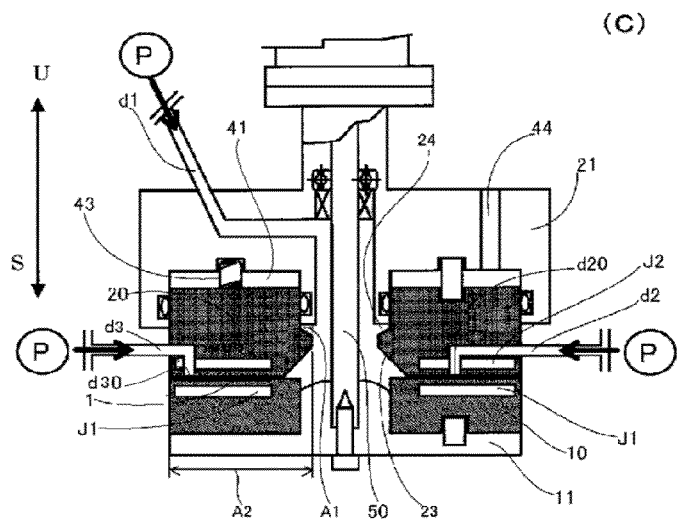
Figure 5:
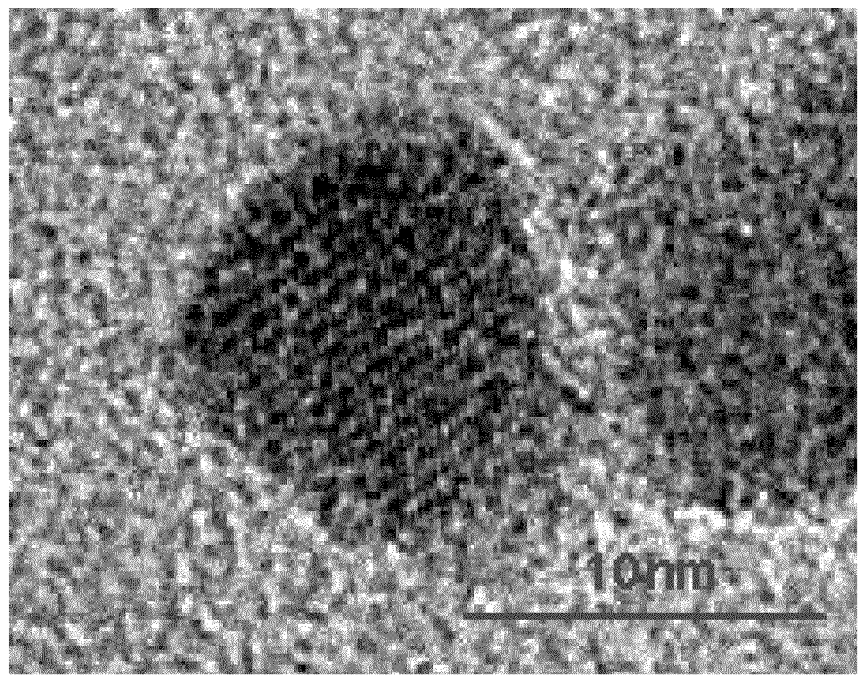
[FIG. 5]
This is the TEM picture of the zinc oxide microparticles prepared in Example 2.

Other Embodiment 1:

According to another embodiment of the present invention, the supplying equipment 51 of the fluid which contains the acidic substance is arranged immediately after discharge of the ceramic microparticles separated between the processing surfaces 1 and 2 as the dispersion solution of the ceramic microparticles, which are separated in the thin film fluid formed between the processing surfaces 1 and 2 of the instrument explained above, in other words, the supplying equipment is arranged near the fluid discharge part 51*b* of the fluid in the processing members 10 and 20; and the fluid which contains the acidic substance is sprayed or gradually added from this supplying equipment 51 thereby mixing the fluid which contains the acidic substance with the dispersion solution of the ceramic microparticles, i.e., the fluid which contains the ceramic microparticles separated between the processing surfaces 1 and 2 (see FIG. 4(A)). More specifically, the supplying equipment 51 is provided with a circular flow path which is connected to source of the fluid which contains the acidic substance via the pump P. This circular flow path is arranged in the position facing to the discharge part 51*b* of the processing surfaces 1 and 2 (in this example, upper part); and in the lower position of the circular flow path is formed the opening 51*a*. To carry out the present invention, preferably this opening 51*a* is formed of many small holes or is formed of continuous slits so that the fluid which contains the acidic substance may be supplied to and uniformly mixed with the dispersion solution which is discharged from the discharge part 51*b*. Meanwhile, this discharge part 51*b* is located in the most downstream side of the flow path which is forced by the processing surfaces 1 and 2 (in this example, the most outer circumference of the processing surfaces 1 and 2); and thus, the thin film fluid is released in the discharge part 51*b* from this force exerted by the processing surfaces 1 and 2 thereby discharging the fluid to a wider space of the flow path. Accordingly, the fluid which contains the acidic substance is supplied to the dispersion solution which is discharged as the widely spreading solution so that the acidic substance may be effectively contacted and acted with the basic fluid which contains the separated ceramic microparticles.

Alternatively, as shown in FIG. 4(B), the charging hole 53 to charge the fluid which contains the acidic substance may be arranged in the flow path 52 thorough which the dispersion solution of the ceramic microparticles discharged from the processing surfaces 1 and 2 passes as a converged stream; and through this charging hole 53, the fluid which contains the acidic substance may be charged. According to the method as mentioned above, there is a merit that a step of separating the ceramic microparticles and a step of mixing the fluid which contains the separated ceramic microparticles with the fluid which contains the acidic substance can be done continuously.

Other Embodiment 2:

In other embodiment, there may be mentioned, for example; a method wherein the fluid which contains the acidic substance is charged into a container such as a beaker and a tank, and then, the basic dispersion solution of the ceramic microparticles discharged from the processing surfaces 1 and 2 is recovered in the container into which the acidic substance or the acidic solvent is charged; and a method wherein the dispersion solution of the ceramic microparticles discharged from the processing surfaces 1 and 2 is recovered in an empty container, and then, the fluid which contains the acidic substance is charged into the container which contains the recovered dispersion solution of the ceramic microparticles. There is no particular restriction as to the stirring equipment and the stirring method in mixing of the fluid which contains the acidic substance with the dispersion solution of the ceramic microparticles in the container as mentioned above.

In the present invention, it is preferable that the acidic substance be uniformly and homogeneously contacted and acted with the basic fluid which contains the ceramic microparticles separated between the processing surfaces 1 and 2; and thus, it is preferable that a step of separating the ceramic microparticles between the processing surfaces 1 and 2 and a step of mixing the fluid which contains the acidic substance with the fluid which contains the ceramic microparticles separated between the processing surfaces 1 and 2 be carried out within three seconds, or more preferably within one second.

In more detail, the time between when, into the thin film fluid that is formed between the processing surfaces 1 and 2 by introducing, as the first fluid, any one of the fluid which contains the ceramic raw material solution and the fluid which contains the solvent for separating ceramic microparticle from the first introduction part d1, one of the introduction path, any other one of the fluid which contains the ceramic raw material solution and the fluid which contains the solvent for separating ceramic microparticle is introduced as the second fluid from the introduction part d2, the other flow path, and when the fluid which contains the ceramic microparticles separated between the processing surfaces 1 and 2 in a thin film fluid is mixed with the fluid which contains the acidic substance is preferably within three seconds, or more preferably within one second.

Alternatively, within the range not adversely affecting separation of the ceramic microparticles, the fluid which contains the acidic substance may be mixed with any one of the fluid which contains the ceramic raw material solution before separation of the ceramic microparticles and the fluid which contains the solvent for separating ceramic microparticle or both; by so doing, the acidic substance may be contacted with and acted to the ceramic microparticles which are separated between the processing surfaces 1 and 2. For example, as mentioned above, the third introduction part d3 other than the first introduction part d1 and the second introduction part d2 is arranged in the processing apparatus; and through each introduction part, as the first fluid, the fluid which contains the solvent for separating ceramic microparticle, as the second fluid, the fluid which contains the ceramic raw material solution, and as the third fluid, the fluid which contains the acidic substance may be separately introduced into the processing apparatus; by so doing, the fluid which contains the acidic substance may be mixed with any one of the fluid which contains the ceramic raw material solution before separation of the ceramic microparticles and the fluid which contains the solvent for separating ceramic microparticle or both; and in this case, location of the opening d30 of the third introduction part d3 of the fluid which contains the acidic substance shall not be restricted.

EXAMPLES

Hereinafter, the present invention will be explained in more detail by Examples; but the present invention is not limited only to these Examples.

It is to be noted here that the term "from the center" in the following Examples means "from the first introduction part d1" of the processing appratus shown in FIG. 1; the first fluid means the first fluid to be processed that is introduced through the first introduction part d1 of the processing apparatus as described before; and the second fluid means the second fluid to be processed that is introduced through the second introduction part d2 of the processing apparatus shown in FIG. 1, as described before.

In Examples, as shown in FIG. 1, the ceramic raw material solution (second fluid) is mixed with the solvent for separating the ceramic microparticles (first fluid) by using a reaction appratus with which these fluids are uniformly dispersed, stirred, and mixed in the thin film fluid formed between the processing surfaces 1 and 2 which are disposed in a position they are faced with each other so as to be able to approach to and separate from each other, at least one of which rotates relative to the other, whereby effecting the separation reaction in the thin film fluid. Thereafter, the fluid which contains the acidic substance (third fluid) is mixed therewith to produce the ceramic microparticles.

Measurement of pH:

Measurement of pH was made by using a pH meter (Type D-51, manufactured by Horiba Ltd.). Before introducing each of the fluids to be processed into the fluid processing apparatus, pH of each of the fluids to be processed was measured at room temperature. The final pH in Table 1 mentioned later was measured at room temperature as to the fluid after mixing of each of the fluids to be processed.

Evaluation of crystallinity is generally done by using UV, solid NMR, Raman spectrophotometry, TEM, XRD, and the like, while in these Examples, evaluation was made by the TEM observation and by the XRD measurement. Specifically, the TEM observation was made to judge whether or not the crystal lattice can be seen in the particles (in the Tables of the Examples, "Good" was shown when the crystal lattice was observed, while "Bad" was shown when the crystal lattice was not observed); and the XRD measurement was made to judge the peak intensity enhancement rate in the peak position at which the maximum peak intensity was observed relative to the peak intensity in Comparative Examples in which the acidic substance was not used as the third fluid.

Examples 1 to 2 and Comparative Examples 1 to 2

While methanol as the first fluid which contained the solvent for separating the ceramic microparticle was introduced from the center with the supply pressure of 0.30 MPa and the back pressure of 0.02 MPa and with the liquid temperature of 20° C. and the rotation speed of 2000 rpm, the ceramic raw material solution in which zinc oxide was dissolved in an aqueous sodium hydroxide with the liquid temperature of 25° C. was introduced as the second fluid into between the processing surfaces 1 and 2. The first fluid and the second fluid were mixed in the thin film fluid, whereby separating the zinc oxide microparticles between the processing surfaces 1 and 2. Thereafter the zinc oxide microparticle dispersion solution which contained the separated zinc oxide microparticles was mixed with an aqueous sulfuric acid as the third fluid. To remove impurities from the mixture solution of the dispersion solution of the zinc oxide microparticles and the third fluid, the zinc oxide microparticles were loosely aggregated, and then, the zinc oxide microparticles were spun down by using a centrifugal separator (×13000 G); and after the supernatant was removed, the zinc oxide microparticles were redispersed by adding pure water and then spun down again by using a centrifugal separator. This washing operation was repeated for three times; and then, a finally obtained paste of the zinc oxide microparticles was dried at 50° C. under vacuum of −0.1 MPaG to obtain dried powders of the zinc oxide microparticles. From the XRD measurement of the powders of the zinc oxide microparticles after drying, the enhancement rate of the peak intensity was calculated. From the TEM observation of the powders of the zinc oxide microparticles after drying, crystal lattice of the zinc oxide microparticles was confirmed. The TEM observation was made in plural view spots with observation magnification of 5,000 or more.

In Table 1, shown are the supply rate and the supply temperature of each of the first, the second, and the third fluids, pH of the third fluid, the method for mixing with the aqueous sulfuric acid as the third fluid, pH after mixing of the first to the third fluids, and crystallinity of the obtained zinc oxide microparticles.

In Table 1, in the case that it is described that the charging spot of the third fluid is "between processing surfaces", the third fluid was introduced through the introduction part for the third fluid between the processing surfaces wherein this introduction part was arranged in the downstream side of the mixing spot of the first fluid and the second fluid. In the case that it is described as "outside processing surfaces", the dispersion solution of the zinc oxide microparticles, which is the fluid which contained the zinc oxide microparticles separated between the processing surfaces 1 and 2, was discharged from the processing surfaces 1 and 2, and then the discharged dispersion solution of the zinc oxide microparticles was mixed with the third fluid. The discharged dispersion solution of the zinc oxide microparticles was mixed with the third fluid by gradually adding the third fluid to the position near the discharge part 51b in the outer periphery side of the processing surfaces 1 and 2, thereby effecting mixing of these fluids at the position near the discharge part 51b and in the flow path 52 in which the discharged solution was converged. Meanwhile, the time between when the second fluid was introduced between the processing surfaces 1 and 2 and when the dispersion solution of the zinc oxide microparticles was discharged from the processing surfaces 1 and 2 was approximately 0.2 seconds for most of the microparticles, while the time between when the dispersion solution of the zinc oxide microparticles was discharged from the processing surfaces 1 and 2 and when it was mixed with the third fluid was approximately 0.3 seconds; and thus, the time between when the second fluid was introduced into between the processing surfaces 1 and 2 and when the dispersion solution of the zinc oxide microparticles which were discharged from the processing surfaces 1 and 2 was mixed with the third fluid was within one second. The supply temperatures of the first fluid and the second fluid were measured at the position just before each of the first fluid and the second fluid was introduced into the processing apparatus (in more detail just before introduction into between the processing surfaces 1 and 2). In Table 1, in the case that it is described that the charging spot of the third fluid is "between processing surfaces", the temperature was measured just before introduction into the processing apparatus, while in Table 1 in the case that it is described that the charging spot of the third fluid is "outside processing surfaces", the temperature was measured just before mixing with the discharged dispersion solution of the zinc oxide microparticles.

Comparative Examples 1 and 2 were carried out without using the acidic substance as the third fluid while other conditions were the same as those of Examples 1 and 2.

From Table 1, it can be seen that, when sulfuric acid was used as the acidic substance in the third fluid, crystallinity of the zinc oxide microparticles was enhanced. Specifically, the zinc oxide microparticles having enhanced crystallinity were obtained in Examples 1 and 2 in which the third fluid was used while the other conditions—the supply rates and supply temperatures of the first fluid and the second fluid, the supply temperature of the third fluid, and pH of the third fluid—were kept constant.

TABLE 1

| | | First fluid | | | Second fluid | | | Third fluid | |
|---|---|---|---|---|---|---|---|---|---|
| | | Kind | Supply rate (mL/min) | Supply temp. (° C.) | Kind | Supply rate (mL/min) | Supply temp. (° C.) | Kind | Charing spot |
| Example | 1 | Methanol | 50 | 20 | 5.5 wt % zinc oxide | 10 | 25 | 20 wt % aq. H$_2$SO$_4$ | Between processing surfaces |
| | 2 | | 300 | 20 | 30 wt % aq. NaOH | | | | Outside processing surfaces |
| Comparative Example | 1 | | 50 | 20 | | | | None | None |
| | 2 | | 300 | 20 | | | | | |

| | | Third fluid | | | | Crystallinity | | Particle |
|---|---|---|---|---|---|---|---|---|
| | | Supply rate (mL/min) | Supply temp. (° C.) | pH | Final pH | TEM Crystal lattice | XRD Enhancement rate (%) | diameter TEM (nm) |
| Example | 1 | 11.5 | 25 | 0.32 | 13.2 | Good | 11 | 20 to 30 |
| | 2 | 11.5 | | | 13.15 | Good | 9 | 5 to 10 |
| Comparative Example | 1 | None | None | None | 13.8 | Good | 0 | 20 to 30 |
| | 2 | | | | 13.7 | Good | 0 | 5 to 10 |

Examples 3 to 8

While methanol as the first fluid which contained the solvent for separating the ceramic microparticles was introduced from the center with the supply pressure of 0.30 MPa and the back pressure of 0.02 MPa and with the liquid temperature of 20° C. and the rotation speed of 2000 rpm, the ceramic raw material solution in which sodium silicate was dissolved in an pure water with the liquid temperature of 25° C. was introduced as the second fluid into between the processing surfaces 1 and 2. The first fluid and the second fluid were mixed in the thin film fluid, whereby separating the silicon oxide microparticles between the processing surfaces 1 and 2. Thereafter the silicon oxide microparticle dispersion solution which contained the separated silicon oxide microparticles was mixed with an aqueous sulfuric acid as the third fluid. To remove impurities from the mixture solution of the dispersion solution of the silicon oxide microparticles and the third fluid, the silicon oxide microparticles were loosely aggregated, and then, the silicon oxide microparticles were spun down by using a centrifugal separator (×13000 G); and after the supernatant was removed, the silicon oxide microparticles were redispersed by adding pure water and then spun down again by using a centrifugal separator. This washing operation was repeated for three times; and then, a finally obtained paste of the silicon oxide microparticles was dried at 50° C. under vacuum of −0.1 MPaG to obtain dried powders of the silicon oxide microparticles. From the TEM observation of the powders of the silicon oxide microparticles after drying, crystal lattice of the silicon oxide microparticles was confirmed. The TEM observation was made in plural view spots with observation magnification of 5,000 or more.

In Table 2, shown are the introduction velocity and the supply temperature of each of the first, the second, and the third fluids, each of pH of the second and the third fluid, the method for mixing with the aqueous sulfuric acid as the third fluid, pH after mixing of the first to the third fluids, and crystallinity of the obtained silicon oxide microparticles.

In Table 2, in the case that it is described that the charging spot of the third fluid is "between processing surfaces", the third fluid was introduced through the introduction part for the third fluid between the processing surfaces wherein this introduction part was arranged in the downstream side of the mixing spot of the first fluid and the second fluid. In the case that it is described as "outside processing surfaces", the dispersion solution of the silicon oxide microparticles, which is the fluid which contained the silicon oxide microparticles separated between the processing surfaces 1 and 2, was discharged from the processing surfaces 1 and 2, and then the discharged dispersion solution of the silicon oxide microparticles was mixed with the third fluid. The discharged dispersion solution of the silicon oxide microparticles was mixed with the third fluid by gradually adding the third fluid to the position near the discharge part 51b in the outer periphery side of the processing surfaces 1 and 2, thereby effecting mixing of these fluids at the position near the discharge part 51b and in the flow path 52 in which the discharged solution was converged. Meanwhile, the time between when the second fluid was introduced between the processing surfaces 1 and 2 and when the dispersion solution of the silicon oxide microparticles was discharged from the processing surfaces 1 and 2 was approximately 0.2 seconds for most of the microparticles, while the time between when the dispersion solution of the silicon oxide microparticles was discharged from the processing surfaces 1 and 2 and when it was mixed with the third fluid was approximately 0.3 seconds; and thus, the time between when the second fluid was introduced into between the processing surfaces 1 and 2 and when the dispersion solution of the silicon oxide microparticles which were discharged from the processing surfaces 1 and 2 was mixed with the third fluid was within one second. The supply temperatures of the first fluid and the second fluid were measured at the position just before each of the first fluid and the second fluid was introduced into the processing apparatus (in more detail just before introduction into between the processing surfaces 1 and 2). In Table 1, in the case that it is described that the charging spot of the third fluid is "between processing surfaces", the temperature was measured just before introduction into the processing apparatus, while in Table 1, in the case that it is described that the charging spot of the third fluid is "outside processing surfaces", the temperature was measured just before mixing with the discharged dispersion solution of the zinc oxide microparticles.

Examples 7 and 8 as Comparative Examples were carried out without using the acidic substance as the third fluid while other conditions were the same as those of Examples 3 and 6.

From Table 2, it can be seen that, when sulfuric acid was used as the acidic substance in the third fluid, crystallinity of the silicon oxide microparticles was enhanced.

TABLE 2

| Example | First fluid | | | Second fluid | | | | Third fluid | |
|---|---|---|---|---|---|---|---|---|---|
| | Kind | Supply rate (mL/min) | Supply temp. (° C.) | Kind | Supply rate (mL/min) | Supply temp. (° C.) | pH | Kind | Charing spot |
| 3 | Methanol | 50 | 20 | 6.0 wt % Sodium silicate | 10 | 25 | 13.2 | 20 wt % aq. $H_2SO_4$ | Between processing surfaces |
| 4 | | | | | | | | | Between processing surfaces |
| 5 | | 200 | 20 | | | | | | Outside processing surfaces |
| 6 | | | | | | | | | Outside processing surfaces |
| 7 | | 50 | 20 | | | | | None | None |
| 8 | | 200 | 20 | | | | | | |

| Example | Third fluid | | | | Crystallinity | Particle |
|---|---|---|---|---|---|---|
| | Supply rate (mL/min) | Supply temp. (° C.) | pH | Final pH | TEM Crystal lattice | diameter TEM (nm) |
| 3 | 5 | 25 | 0.32 | 6.3 | Good | 5 to 10 |
| 4 | 10 | | | 2 | Good | 5 to 10 |
| 5 | 5 | | | 6.1 | Good | 10 to 20 |
| 6 | 10 | | | 2.2 | Good | 10 to 20 |
| 7 | None | None | None | 12.9 | Bad | 10 to 200 |
| 8 | | | | 13 | Bad | 10 to 500 |

1 first processing surface
2 second processing surface
10 first processing member
11 first holder
20 second processing member
21 second holder
51a opening
51b discharge part
d1 first introduction part
d2 second introduction part
d3 third introduction part
d20 opening
d30 opening

The invention claimed is:

1. A method for producing a ceramic microparticle, comprising the steps of:
   (I) preparing a ceramic raw material solution that is obtained by mixing and/or dissolving at least one ceramic raw material in a basic solvent;
   (II) preparing a solvent for separating a ceramic microparticle;
   (III) preparing at least one acidic substance;
   (IV) separating a ceramic microparticle, comprising the sub-steps of:
      preparing at least two fluids to be processed, including a first fluid and a second fluid, at least one of the first and second fluids containing the ceramic raw material solution, at least the other of the first and second fluids containing the solvent for separating the ceramic micropaticle;
      introducing the at least two fluids into a processing device, the processing device comprising at least two processing surfaces facing each other, the at least two processing surfaces being operable to approach to and separate from each other, at least one of the at least two processing surfaces rotating relative to the other;
      mixing the at least two fluids in a space formed between the at least two processing surfaces, thereby forming a thin film fluid between the at least two processing surfaces; and
      separating the ceramic microparticle in the thin film fluid to obtain a separated ceramic microparticle; and
   (V) mixing a fluid which contains the separated ceramic microparticle obtained in the step (IV) with a fluid which contains the at least one acidic substance.

2. The method for producing a ceramic microparticle according to claim 1, wherein the processing device includes a first flow path for introducing one of the first and second fluids into the space between the at least two processing surfaces, and a second flow path, independent of the first flow path, for introducing the other of the first and second fluids, the second flow path leading to at least one opening formed on at least one of the at least two processing surfaces, said the other of the first and second fluids being introduced into the space between the at least two processing surfaces through the at least one opening.

3. The method for producing a ceramic microparticle according to claim 1, wherein the step (IV) and the step (V) are carried out continuously.

4. The method for producing a ceramic microparticle according to claim 3, wherein at least any one of the at least two processing surfaces is provided with an opening to introduce the fluid which contains the at least one acidic substance into the space between the at least two processing surfaces, and after the step (IV)

the at least one acidic substance is contacted and reacted with the fluid which contains the separated ceramic microparticle in the thin film fluid.

5. The method for producing a ceramic microparticle according to claim 3, wherein an opening to supply the fluid which contains the at least one acidic substance is arranged in a position to face a discharge part of the at least two processing surfaces, after the step (IV), the fluid which contains the separated ceramic microparticle is discharged through the discharge part, and immediately thereafter, the at least one acidic substance is contacted and reacted with the fluid which contains the separated ceramic microparticle.

6. The method for producing a ceramic microparticle according to claim 1, further comprising the step of utilizing a heat of reaction that is generated by mixing the fluid which contains the separated ceramic microparticle with the fluid which contains the at least one acidic substance to control a crystallinity of the ceramic microparticle.

7. The method for producing a ceramic microparticle according to claim 2, wherein the step (IV) and the step (V) are carried out continuously.

* * * * *